US008640223B2

(12) United States Patent  
Yu

(10) Patent No.: US 8,640,223 B2  
(45) Date of Patent: Jan. 28, 2014

(54) AUXILIARY DISPLAY SYSTEM, DEVICE AND METHOD

(75) Inventor: Chentao Yu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1022 days.

(21) Appl. No.: 12/228,308

(22) Filed: Aug. 12, 2008

(65) Prior Publication Data

US 2009/0055647 A1    Feb. 26, 2009

(30) Foreign Application Priority Data

Aug. 21, 2007 (CN) .......................... 2007 1 0120580

(51) Int. Cl.  
*H04L 29/06* (2006.01)  
*G06F 21/00* (2013.01)

(52) U.S. Cl.  
USPC ........................................... 726/16; 713/153

(58) Field of Classification Search  
None  
See application file for complete search history.

(56) References Cited

U.S. PATENT DOCUMENTS

| | | | |
|---|---|---|---|
| 7,395,549 B1 * | 7/2008 | Perlman et al. | 726/10 |
| 2003/0165240 A1 * | 9/2003 | Bantz et al. | 380/54 |
| 2005/0177284 A1 * | 8/2005 | Kugumiya et al. | 701/1 |

* cited by examiner

*Primary Examiner* — Gilberto Barron, Jr.  
*Assistant Examiner* — Izunna Okeke  
(74) *Attorney, Agent, or Firm* — Osha Liang LLP

(57) ABSTRACT

The present invention provides an auxiliary display system, device and method. The auxiliary display system includes a client and a server. The client includes an auxiliary display unit which further includes a security module. The server generates information to be shown in the auxiliary display unit, and uses a shared encryption key of the auxiliary display unit to encrypt the information. The security module uses the shared encryption key to verify validity of encrypted information from the server, and decrypts the encrypted information so that the decrypted information will be shown in the auxiliary display unit. The present invention can prevent from forging the auxiliary display information by malicious programs and provide users with reliable information display, and improve experience of the users.

18 Claims, 5 Drawing Sheets

AUXILIARY DISPLAY SYSTEM, DEVICE AND METHOD

BACKGROUND OF THE INVENTION

1. Field of Invention

The present invention relates to secure communication in the computer networks, and in particular to an auxiliary display system, device and method.

2. Description of Prior Art

With the rapid development of electronic commerce, more and more users are gradually used to the service on personal financial management and doing transaction online. However, the worry of users about network security has already restricted the further development of electronic commerce and electronic payment. To electronic payment, the biggest threat against security is mainly from two sides. One is a phishing website that sends emails or on-line information with malicious network links to ordinary users by ways such as email or instant messages. After a user reads the contents of the email or instant messages, the malicious website pointed by the link is visited, causing undesired payment to the user. Another one is malicious software that resides in the host computer of a user. Malicious software collects the key financial data saved by the user by technical means, and forges transactions of the user through the financial data, again causing losses to the user.

Therefore, manufacturers of operating system and email service providers, and providers of security solutions all provided various solutions to deal with this matter. For example, network browsers clue the user that the website is an insecure site when an unauthentic website is linked; users can install a browser and forbid the browser to pop out the pop-up window of an unauthentic source; the website is compulsively required to equip itself with HTTPS when financial transactions are taken with verification of the certificate of HTTPS performed by the browser; or the third party is consigned to build a white list and a black list to verify the validity of the website link.

Presently, schemes aimed at security usually used are (1) with an electronic device with one-time cipher display, a flexible display and a unit of generating security encryption key is added to a credit card. An algorithm is synchronized with a server. But this method is not conveniently for use because the display device cannot link to a computer and the contents can not be updated; (2) a sideshow display. An independent display screen is installed in a device, having an independent system driving display and simple interactive ability.

However, regarding the above-mention scheme (2), users usually ignore security clues of the browser and security clues of the system in the local computer because users are short of knowledge related to security. Financial frauds continually occur. In addition, the displayed contents lack an effective validation because the display uses open systems with low security. As a result, malicious programs and websites can easily intercept and capture displayed contents of the sideshow. They may modify, forge, or blot out the normal clues of system in order to induce users to trust malicious programs or websites. Therefore, it is not suitable for applications of payment.

Therefore, on the basis of sideshow display applied widely now, it is desired to further prevent forgery of malicious programs and to provide reliable information display to users.

SUMMARY OF THE INVENTION

The present invention is to provide an auxiliary display scheme, which can prevent forgery of malicious programs through encryption of auxiliary display information, and provide users with reliable information display to improve experience of the users.

According to the present invention, an auxiliary display system is provided.

The auxiliary display system includes a client and a server, wherein the client includes an auxiliary display unit which further includes a security module. The server generates information to be shown in the auxiliary display unit and uses a shared encryption key of the auxiliary display unit to encrypt the information. The security module uses the shared encryption key to verify the validity of encrypted information so that the decrypted information will be displayed in the auxiliary display unit.

The auxiliary display system further includes an authentication center, which implement at least one of the followings: management of the shared encryption key information of the server and the auxiliary display unit, verifying the validity of the auxiliary display unit, and security initialization of the auxiliary display unit. The authentication center can be a logical part inside the server or an independent server device.

The shared encryption key information may include display data encryption key information, display data signature key information, security initialization data encryption key information, and/or security initialization data signature key information.

The security initialization implemented in the authentication center is dominated by the client or by the server. When the security initialization is dominated by the client, in the case that the authentication center verifies the auxiliary display unit as valid according to a preset encryption key, the auxiliary display unit generates a digital certificate and submits to the authentication center to be saved. Then the authentication center sends the digital certificate to the server and feeds back initialization information of the server sent back by the server to the client. The auxiliary display unit updates the encrypted information of the server in the case of verifying the initialization information of the server as valid. When the security initialization is dominated by the server, in the case that the authentication center verifies the auxiliary display unit as valid according to a preset encryption key, the authentication center generates a digital certificate, sends the digital certificate to the client, and uses the preset encryption key to encrypt and sign the digital certificate. Then the authentication center sends the digital certificate to the server, feeds back initialization information of the server sent back by the server to the client. The auxiliary display unit updates the encrypted information of the server in the case of verifying the initialization information of the server as valid. The preset encryption key mentioned above can be an encryption key of hardware mask preset by the security module or a read only encryption key preset by the device provider.

The security module can save multiple pieces of encryption information of multiple applications. The server centrically manages the multiple pieces of encryption information, and realizes synchronization of the multiple pieces of encryption information.

The auxiliary display unit can further comprise: a display module, for displaying decrypted information decrypted by the security module to the users at the client; a display driving module, for refreshing of the display module and generation of pixels; a host communication module, which communicates with the client; and a storage module, which saves the contents to be displayed in the auxiliary display unit and display data format according to settings.

In the system, encrypted information displayed in the auxiliary display unit is passive information and/or interactive information. The passive information is the information not necessarily required by operations of the users at the client. The interactive information is the information required by operations of the users at the client.

According to the present invention, an auxiliary display device is also provided.

The auxiliary display device comprises: a security unit, for decrypting the encrypted information provided by the server and displayed in the auxiliary display device in order to verify the validity of the encrypted information, in which an encryption key used for the decryption by the security unit is a shared encryption key of the auxiliary display device and the server; a display unit, for displaying the decrypted information decrypted by the security unit; a display driving unit, for refreshing of the display unit and generation of pixels; and a host communication unit, for realizing the communication between the auxiliary display device and the client.

The auxiliary display device can further comprise: a storage unit, for saving contents to be displayed in the auxiliary display device and display data format according to settings.

In addition, the encrypted information displayed in the display unit is passive information and/or interactive information. The passive information is the information not necessarily required by operations of the users at the client. The interactive information is the information required by operations of the users at the client.

According to the present invention, a terminal device with the auxiliary display device is provided.

In addition, an auxiliary display method is provided according to the present invention.

The auxiliary display method of the present invention comprises the steps of: performing security initialization of a server and an auxiliary display unit at the client; the server generates information to be displayed in an auxiliary display unit and encrypts the information by using the shared encryption key of the auxiliary display unit to obtain encrypted information; the server submits the encrypted information to the auxiliary display unit through the client; and the security module in the auxiliary display unit uses the shared encryption key to decrypt the encrypted information to verify the validity of the encrypted information, and performs subsequent processes according to the result of the verification.

In the method, the security initialization of the auxiliary display unit and the server is dominated by the client or by the server.

When security initialization is dominated by the client, the method further comprises the steps of:

the authentication center verifies the validity of the auxiliary display unit according to a preset encryption key; the auxiliary display unit generates a digital certificate in the case of verifying the auxiliary display unit as valid; the authentication center saves the digital certificate submitted by the auxiliary display unit, and sends the digital certificate to the server; the authentication center feeds back initialization information of the server sent back by the server to the client; and the auxiliary display unit verifies the validity of the initialization information of the server, and updates the encrypted information of the server in the case of verifying it as valid.

When security initialization is dominated by the server, the method further comprises the steps of:

the authentication center verifies the validity of the auxiliary display unit according to a preset encryption key; the authentication center generates a digital certificate in the case of verifying the auxiliary display unit as valid; the authentication center sends the digital certificate to the client, and uses a preset encryption key to encrypt and sign the digital certificate; the authentication center sends the digital certificate to the server; the authentication center feeds back initialization information of the server sent back by the server to the client; and the auxiliary display unit verifies the validity of the initialization information of the server, and updates the encrypted information of the server in the case of verifying it as valid.

The preset encryption key can be an encryption key of hardware mask preset by the security module or a read only encryption key preset by the device provider.

In this method, the subsequent steps may specifically be: the auxiliary display unit displays decrypted information in the case of the encrypted information being valid; and the auxiliary displays unit displays abnormality in the case of the encrypted information being invalid.

In addition, the information displayed in the auxiliary display unit is passive information and/or interactive information. The passive information is the information not necessarily required by operations of the users at the client. The interactive information is the information required by operations of the users at the client.

The solution of the present invention can effectively prevent from forging the auxiliary display information by malicious programs and provide reliable message displayed to the users. Experience of the user is improved.

Other features and advantages of the present invention will be stated and become apparent in part. The objects of the present invention and other advantages will be further understood as particularly given in the specification, claims and drawings.

BRIEF DESCRIPTION OF THE DRAWINGS

The drawings are for facilitating further understanding of the present invention and constitute a part of the specification. The drawings are used to explain the present invention along with the embodiments of the present invention, and are not intended to limit the present invention, in which.

DETAILED DESCRIPTION OF EMBODIMENTS

Hereafter embodiments of the present invention will be explained in detail with reference to the figures. The embodiments are given to facilitate understanding to the present invention, but do not intend to limit the present invention.

In the technical scheme of each embodiment of the present invention, display information of the auxiliary display unit is encrypted (for example, operations of related encrypting and decrypting can be realized through the security module in the server and the auxiliary display unit), to realize security display of auxiliary information. The schemes provided by the embodiments of the present invention can be applied to a verification flow with high-level security such as those for electronic payment and secure login.

Embodiment of System

According to an embodiment of the system of the present invention, an auxiliary display system is provided.

Figure 1:
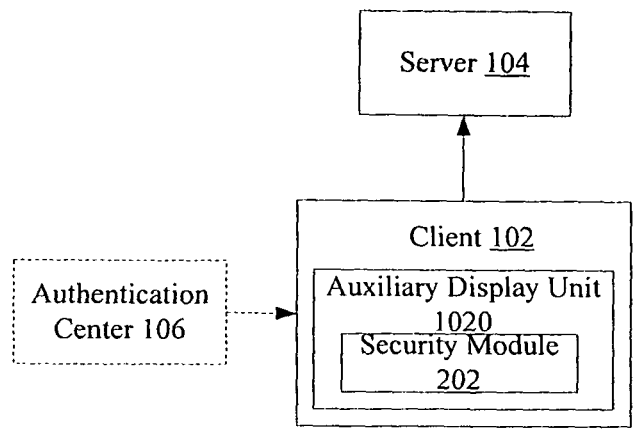
FIG. 1 is a block diagram of the auxiliary display system according to an embodiment of the system of the present invention.

As shown in FIG. 1, the auxiliary display system includes a client 102 and a server 104. Client 102 includes an auxiliary display unit 1020.

Server 104 connects and interacts with client 102 through network. The server also generates display information of auxiliary display unit 1020, and uses a shared encryption key of the auxiliary display unit to encrypt the information. Client 102 connects with server 104 through network, receives feedback of the server, and meanwhile communicates with auxiliary display unit 1020 in the server.

The auxiliary display unit 1020 includes a security module 202. The security module uses the shared encryption key of auxiliary display unit 1020 and server 104 to verify the validity of encrypted information to be displayed in the auxiliary display unit 1020 provided by server 104, and decrypted information can be displayed in auxiliary display unit 1020 in the case of verifying it as valid. Alternatively, client 102 can obtain the shared encryption key from auxiliary display unit 1020, verify the validity of feedback of server 104, and set the contents displayed in the auxiliary display unit.

In this system, the encrypted information displayed in the auxiliary display unit is passive information and/or interactive information. The passive information is the information not necessarily required by operations of the users at the client (for example, clue information). The interactive information is the information required by operations of the users at the client (for example, a password or verification code required by an operation). Further details will be described hereunder.

Security module 202 can save multiple pieces of encrypted information of multiple applications. The server 104 centrically manages the multiple pieces of encrypted information and realizes synchronization of the multiple of encrypted information.

Figure 2:
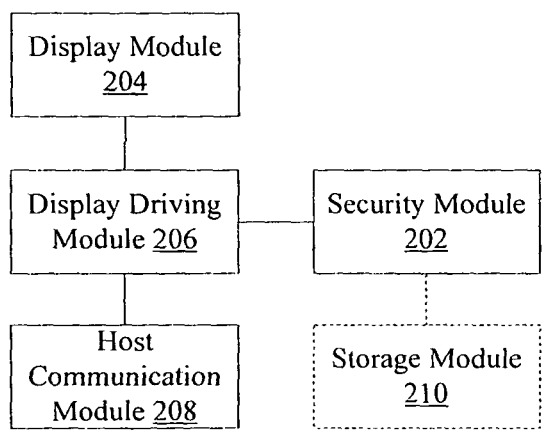
FIG. 2 is a block diagram of the auxiliary display unit in the system shown in FIG. 1.

As shown in FIG. 2, besides the security module 202, the auxiliary display unit can further include: a display module 204, for displaying the decrypted information decrypted by the security module to the users at the client, which can be an LCD display screen, an OLED display screen or a VFD display screen; a display driving module 206 driven by a single chip micyoco or an independent chip, for refreshing of the display module and generation of pixels, and for receiving the decrypted information decrypted by the security module; a host communication module 208, for communication with the client; and a storage module 210 (optional module), for saving the contents to be displayed in the auxiliary display unit and saving display data format according to settings.

As shown in FIG. 1, preferably, the secure display system further includes an authentication center 106, for realizing at least one of the following functions: managing the shared encryption key information of the server and the auxiliary display unit (for example, display data encryption key information, display data signature key information, security initialization data encryption key information, and/or security initialization data signature key information), verifying the validity of the auxiliary display unit, and implementing security initialization of the auxiliary display unit. The authentication center can be a logical part inside the server, or an independent server device.

An encrypting mode with symmetrical key may include DES, 3DES, AES, RC4, RC5 and so on. An encrypting mode with unsymmetrical key may include RSA, ECC. In order to ensure uploaded information not to be modified, a digital signature can be applied upon the information. A digital signature algorithm can be SHA-1, MD5 and HMAC.

Specifically, the security initialization implemented by authentication center 106 is dominated by the client or the server. When security initialization is dominated by client 102, in the case of that the authentication center 106 verifies the auxiliary display unit 1020 as valid according to a preset encryption key (for example, it can be an encryption key of hardware mask preset by the security module, which is set before delivery from the factory and cannot be read and modified externally), the auxiliary display unit generates a digital certificate and submits it to the authentication center to be saved. Then the authentication center sends the digital certificate to server 104 and feeds back initialization information of the server sent back by the server to the client. In the case of verifying initialization information of the server as valid, the auxiliary display unit updates related encrypted information of the server.

When the security initialization is dominated by server 104, in the case that the authentication center 106 verifies the auxiliary display unit 1020 as valid according to a preset encryption key, the authentication center generates a digital certificate and sends it to client 102, and uses the preset encryption key to encrypt and sign the digital certificate. Then the authentication center sends the digital certificate to the server, and feeds back initialization information of the server sent back by the server to the client. In the case of verifying the initialization information of the server as valid, the auxiliary display unit updates secure authentication information of the server. The preset encryption key can be an encryption key of hardware mask preset by the security module or a read only encryption key preset by the device provider.

As stated above, client 102 communicates with server 104 through network. A private network channel can be used according to settings when initialization of the auxiliary display unit is implemented. For example, heterogeneous networks can be used to transmit different authentication information in order to improve security. In the network communication, some modes such as HTTPS (Secure Hypertext Transfer Protocol), SSL (Secure Sockets Layer), IPSEC, and VPN (Virtual Private Network) can be used to implement secure channel encrypting.

Device Embodiment

According an embodiment of device of the present invention, an auxiliary display device is provided.

Figure 3:
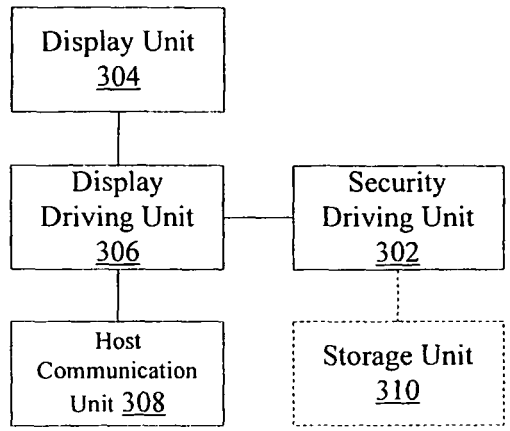
FIG. 3 is a block diagram of the auxiliary display device according to an embodiment of the device of the present invention.

As shown in FIG. 3, the auxiliary display device includes: a security unit 302, for decrypting encrypted information to be displayed in the auxiliary display device provided by the server in order to verify the validity of the encrypted information, in which an encryption key used in the decryption by the security unit is a shared encryption key of the auxiliary display device and the server; a display unit 304, for displaying the decrypted information decrypted by the security unit; a display driving unit 306 for receiving the decrypted information decrypted by the security module, and for refreshing of the display unit and generation of pixels; and a host communication unit 308, for realizing communication between the auxiliary display device and the client.

Preferably, the auxiliary display device can further include: a storage unit 310, which saves contents to be displayed in the auxiliary display device and display data format according to settings.

In addition, similar to those described in the embodiment of system, the encrypted information displayed in the display unit is passive information and/or interactive information.

The passive information is the information not necessarily required by operations of the users at the client. The interactive information is the information required by operations of the users at the client. Technical details described in the embodiment of the system are also applicable to the embodiment the device. Descriptions of the same or similar parts are omitted.

According to the present invention, a terminal device equipped with the auxiliary display device is provided. For example, the client described in the embodiment of system is such a kind of terminal device, for which description is not repeated.

Embodiment of Method

According to an embodiment of method of the present invention, an auxiliary display method is provided.

Figure 4:
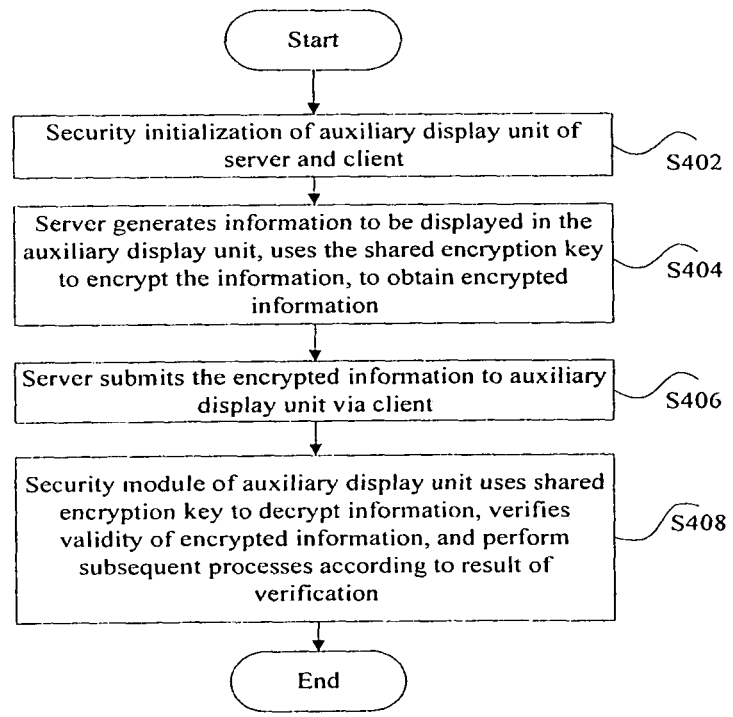
FIG. 4 is a flow diagram of the auxiliary display method according to an embodiment of the method of the present invention.

As shown in FIG. 4, the method includes the steps of:

step S402, performing security initialization to a server and an auxiliary display unit at a client;

step S404, the server generates information to be displayed in the auxiliary display unit, and uses a shared encryption key of the auxiliary display unit to encrypt the information in order to obtain encrypted information;

step S406, the server submits the encrypted information to the auxiliary display unit via the client;

and step S408, a security module in the auxiliary display unit uses the shared encryption key to decrypt the encrypted information, verifies validity of the encrypted information, and implements subsequent processes according to the result of the verification.

In the method, implementing security initialization to the auxiliary display unit and the server is dominated by the client or by the server.

Figure 5:
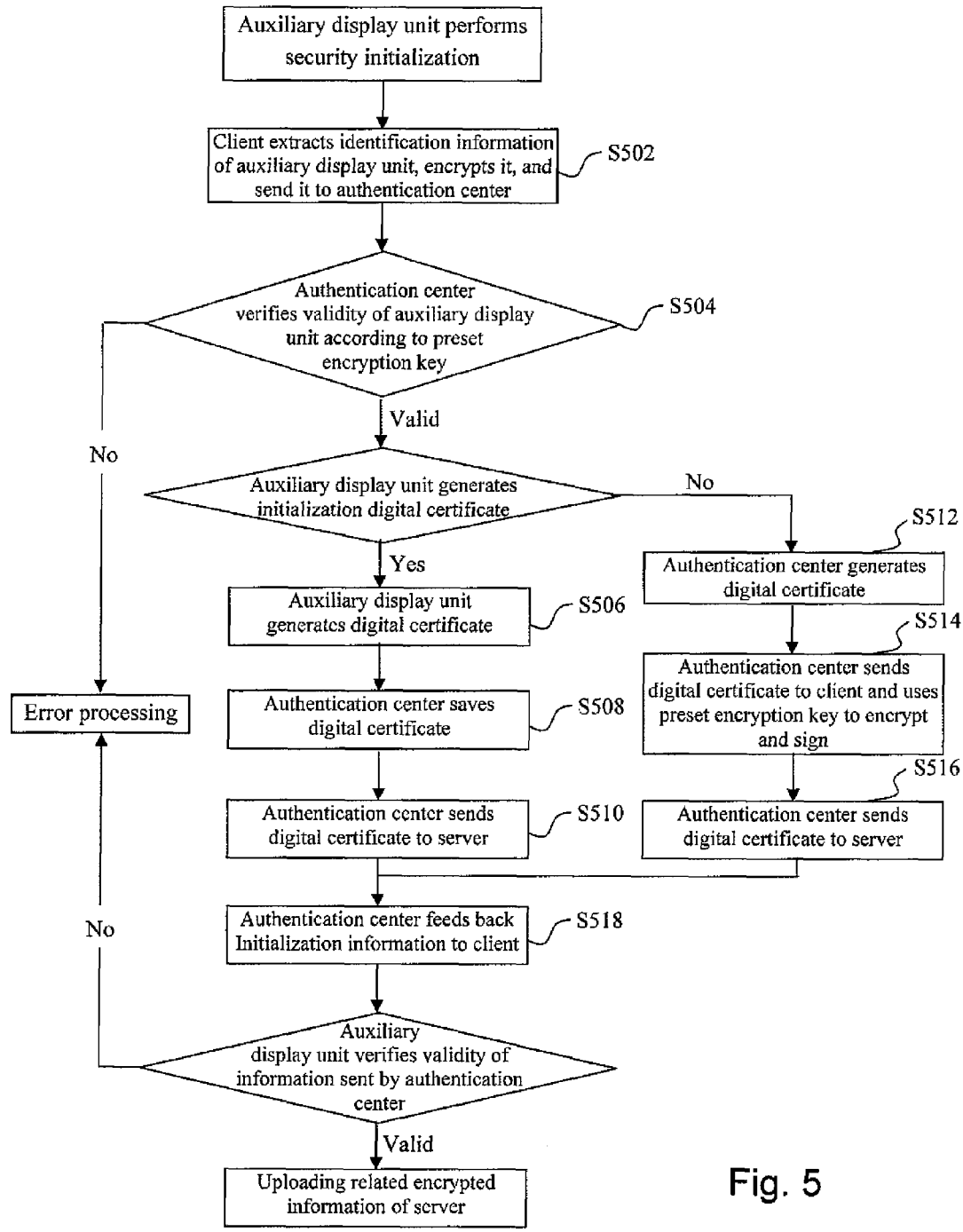
FIG. 5 is a flow diagram of a process of security initialization in the method shown in FIG. 4.

Specifically, as shown in FIG. 5, the client firstly extracts identification information of the auxiliary display unit, encrypts it and sends it to the authentication center (step S502) when security initialization is implemented. Then the authentication center verifies the validity of the auxiliary display unit (step S504) according to a preset encryption key (for example, it can be an encryption key of hardware mask preset by the security module and is set before delivery from the factory and cannot be read and modified externally. It can also be a read only encryption key preset by the device provider); in the case of verifying the auxiliary display unit as valid, subsequent processes are implemented respectively according to security initialization being dominated by the client or by the server.

In the case of security initialization being dominated by the client, going to step S506, the auxiliary display unit generates a digital certificate; step S508, the authentication center saves the digital certificate submitted by the auxiliary display unit, and sends the digital certificate to the server in step S510; step S518, the authentication center feeds back initialization information of the server sent back by the server to the client; step S520, the auxiliary display unit verifies the validity of the initialization information of the server, and updates related encrypted information of the server in step S522 in the case of verifying it as valid.

In the case of security initialization being dominated by the client, going to step S512, the authentication center generates a digital certificate; step S514, the authentication center sends the digital certificate to the client, and uses a preset encryption key to encrypt and sign the digital certificate; step S516, the authentication center sends the digital certificate to the server; step S518, the authentication center feeds back initialization information of the server sent back by the server to the client; step S520, the auxiliary display unit verifies the validity of initialization information of the server, and updates related encrypted information of the server in step S522 in the case of verifying it as valid.

In the processes, in the case of the authentication center verifying the auxiliary display unit as invalid, or the auxiliary display unit verifying initialization information of the server as invalid, an error processing is taken.

The subsequent processes mentioned in step S408 are specifically that: in the case of encrypted information being valid, the auxiliary display unit displays decrypted information; in the case of encrypted information being invalid, the auxiliary display unit displays abnormally (or ignores the encrypted information).

In this method, the information displayed in the auxiliary display unit is passive and/or interactive information. The passive information is the information not necessarily required by operations of the user at the client. The interactive information is the information required by operations of the user at the client. For example, in the case that a user implements an electronic payment, when the user enters an electronic payment website which has passed security verification, the auxiliary display unit may display the message pushed by the server such as "this website has already passed security authentication", to give the security clue to the transaction process of the user, so that security experience of the user is improved. The scheme provided by the present invention can also be applied to display simple interactive information such as using for verification code etc. Because hackers cannot get this information, they cannot go through the normal transaction process and accordingly security of the system is enhanced.

In the following, the embodiment of the present invention is further described by combining illustrative examples.

EXAMPLE 1

Secure Login Service

In this example, the contents displayed in the auxiliary display unit are interactive information, such as the necessary verification codes for user login.

Figure 6:
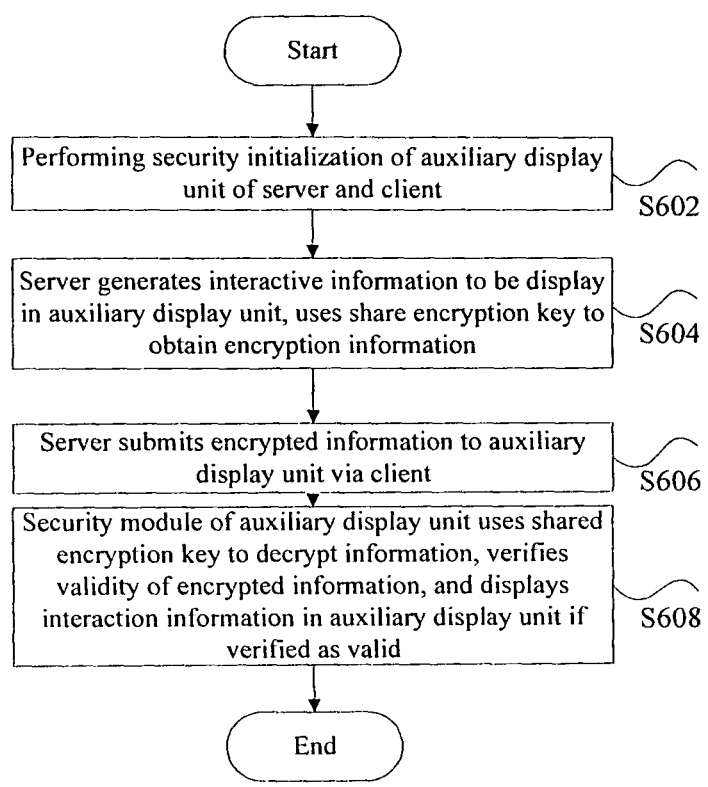
FIG. 6 is a flow diagram of Example 1 according to an embodiment of the present invention.

Specifically, as shown in FIG. 6, the example may include steps of:

step S602, implementing security initialization of the server and the auxiliary display unit at the client;

step S604, the server generates interactive information (verification code) to be displayed in the auxiliary display unit, and encrypts the information by the applying shared encryption key of the auxiliary display unit to obtain encrypted information;

step S606, the server submits the encrypted information to the auxiliary display unit via the client;

step S608, the security module in the auxiliary display unit decrypts the encrypted information by applying the shared encryption key, verifies the validity of the encrypted information, and displays the interactive information (verification code) in the auxiliary display unit in the case of verifying it as valid.

When a user logs on a website, the auxiliary display unit displays verification code of the user and the user inputs the verification code at the client to complete the login process. Because hackers cannot get this information, they cannot go through the normal transaction process and accordingly security of the system is enhanced.

EXAMPLE 2

Security Clue Service

When a user makes an electronic payment and enters an electronic payment website which has passed security verification, the contents pushed by the server make the auxiliary display unit to display a clue message showing that this website has already passed security verification, which gives the security clue to the transaction process of the user.

Figure 7:
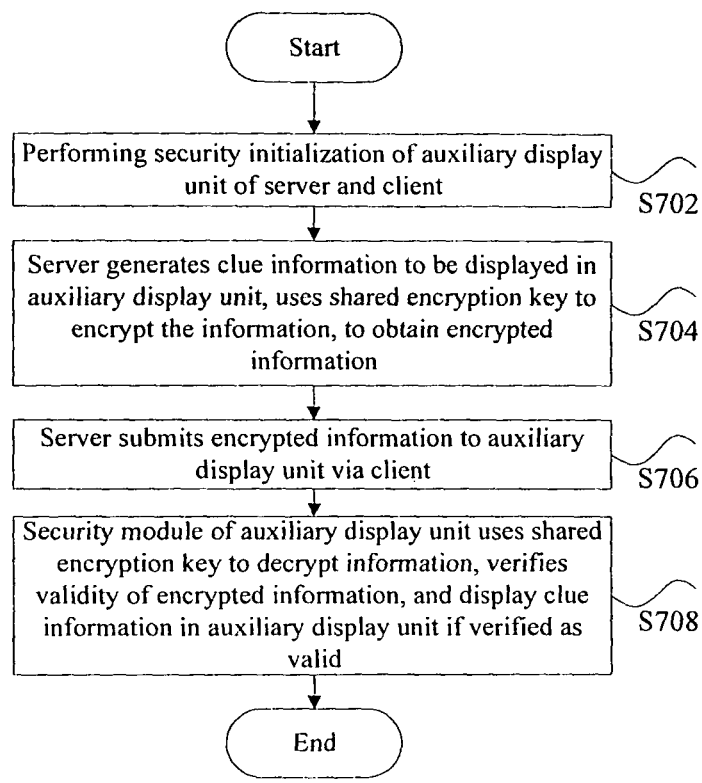
FIG. 7 is a flow diagram of Example 2 according to an embodiment of the present invention.

Specifically, as shown in FIG. 7, this example may comprise the steps of:

step S702, performing security initialization of the server and the auxiliary display unit at the client;

step S704, the server generates a clue message (also called a passive message, for example, "this website has passed security authentication to be carefree for login") to be displayed in the auxiliary display unit, and uses the shared encryption key of the auxiliary display unit to encrypt the information and obtain encrypted information;

step S706, the server submits the encrypted information to the auxiliary display unit via the client;

step S708, the security module in the auxiliary display unit decrypts the encrypted information by applying the shared encryption key, verifies the validity of the encrypted information, and subsequently displays the clue message in the auxiliary display unit in the case of verifying it as valid.

Compared with that in Example 1, the information displayed in the auxiliary display unit in Example 2 does not essentially affect the user's operation at the client, but may improve security experience of the user by giving the security clue to the user.

The technical scheme provided by the present invention can prevent from forging auxiliary display information by malicious programs, and provide users with reliable information display. Experience of the users is improved.

Although the present invention has been described with reference to preferred embodiments, the invention should not be limited to them. It will be appreciated for those skilled in the art that various modifications and changes can be made. Any modifications, equivalent substitutions and improvements and so on in the spirit and principle of the present invention, should be in the protection scope of the present invention.

What is claimed is:

1. An auxiliary secure display system, including a client and a server that connects with the client through a network, wherein the client includes a main display unit which directly displays information received via a network, and an auxiliary display unit which comprises a security module; the server generates information to be displayed in the auxiliary display unit when the client accesses the server by means of the main display unit via the network, and uses a shared encryption key of the auxiliary display unit to encrypt the information; the security module uses the shared encryption key to verify the validity of the encrypted information provided by the server via the network to display the decrypted information in the auxiliary display unit, wherein when a security initialization is dominated by the client, in the case of the authentication center verifying the auxiliary display unit as valid according to a preset encryption key, the auxiliary display unit generates a digital certificate and submits it to the authentication center to be saved; the authentication center sends the digital certificate to the server, and feeds back the server initialization information sent back by the server to the client; and the auxiliary display unit updates the encrypted information of the server in the case of verifying initialization information of the server as valid, and wherein when a security initialization is being dominated by the server, in the case of the authentication center verifying the auxiliary display unit valid according to a preset encryption key, the authentication center generates a digital certificate, sends it to the client, and uses the preset encryption key to encrypt and sign the digital certificate; the authentication center sends the digital certificate to the server, and feeds back the server initialization information sent back by the server to the client; and the auxiliary display unit updates the encrypted information of the server in the case of verifying initialization information of the server as valid.

2. The auxiliary secure display system according to claim 1, wherein, the secure display system further comprises an authentication center for realizing at least one of the following functions: managing information of the shared encryption key of the server and the auxiliary display unit, verifying validity of the auxiliary display unit, and implementing the security initialization of the auxiliary display unit.

3. The auxiliary secure display system according to claim 2, wherein, the authentication center is a logical part in the server or an independent server device.

4. The auxiliary secure display system according to claim 2, wherein, the shared encrypted information includes display data encryption key information, display data signature key information, security initialization data encryption key information, and/or security initialization data signature key information.

5. The auxiliary secure display system according to claim 2, wherein, the security initialization implemented by the authentication center is dominated by the client or by the server.

6. The auxiliary secure display system according to claim 5, wherein, the preset encryption key is an encryption key of hardware mask preset by the security module or a read only encryption key preset by device provider.

7. The auxiliary secure display system according to claim 1, wherein, the security module saves multiple pieces of encrypted information; the server centrally manages the multiple pieces of encrypted information and realizes synchronization of the multiple pieces of encrypted information.

8. The auxiliary secure display system according to claim 1, wherein, the auxiliary display unit further comprises a program for implementing:

a display module configured to display the decrypted information decrypted by the security module to the user at the client;

a display driving module configured to refresh the display module and generation of pixels;

a host communication module configured to communicate with the client; and a storage module configured to save contents to be displayed in the auxiliary display unit and to save display date format according to settings.

9. The auxiliary secure display system according to claim 1, wherein, the encrypted information displayed in the auxiliary display unit is passive information and/or interactive information; the passive information is the information not necessarily required by operations of the user at the client; and the interactive information is the information required by operations of the user at the client.

10. An auxiliary display device, comprising a processor for implementing:

a security unit configured to decrypt encrypted information to be displayed in an auxiliary display device provided by a server through a network in order to verify validity of the encrypted information, the encrypted information being encrypted by the server using a shared encryption key of the auxiliary display device and the server, wherein the encryption key used by the security unit to decrypt is the shared encryption key;

a display unit configured to display the decrypted information decrypted by the security unit;

a display driving unit configured to refresh the display unit and generation of pixels; and a host communication unit configured to realize communication between the auxiliary display device and a client, wherein the client comprises a main display unit which directly displays information received via a network, and connects with the server through the network, wherein the information to be displayed in the auxiliary display device provided by the server is generated when the client accesses the server by means of the main display unit via the network.

11. The auxiliary display device according to claim 10, further comprising:

a storage unit configured to save the contents to be displayed in the auxiliary display device and display data format according to settings.

12. The auxiliary display device according to claim 10, wherein, the encrypted information displayed in the display unit is passive and/or interactive information;

the passive information is the information not necessarily required by operations of the user at the client; and the interactive information is the information required by operations of the user at the client.

13. A terminal device, comprising the auxiliary display device according to claim 10.

14. An auxiliary display method, comprising the steps of:

performing security initialization of a server and an auxiliary display unit at a client, the server and the client connecting to each other through a network, wherein the client includes a main display unit which directly displays information received via a network;

on the server, generating information to be displayed in the auxiliary display unit when the client accesses the server by means of the main display unit via the network, and encrypting the information by applying a shared encryption key of the auxiliary display unit to obtain encrypted information;

submitting the encrypted information to the auxiliary display unit via the client; and decrypting, in a security module in the auxiliary display unit, the encrypted information by applying the shared encryption key, verifying the validity of the encrypted information, and performing subsequent processes according to result of the verification, wherein when the security initialization is dominated by the client, the method comprises the steps of:

an authentication center verifies the validity of the auxiliary display unit according to a preset encryption key;

in the case of the auxiliary display unit being verified as valid, the auxiliary display unit generates a digital certificate;

the authentication center saves the digital certificate submitted by the auxiliary display unit and sends the digital certificate to the server;

the authentication center feeds back the initialization information of the server sent back by the server to the client; and the auxiliary display unit verifies the validity of the server initialization information, and updates the encrypted information of the server in the case of verifying it as valid, and wherein when the security initialization is dominated by the server, comprising the steps of:

an authentication center verifies the validity of the auxiliary display unit according to a preset encryption key;

in the case of the auxiliary display unit being verified as valid, the authentication center generates a digital certificate;

the authentication center sends the digital certificate to the client, and uses the preset encryption key to encrypt and sign the digital certificate;

the authentication center sends the digital certificate to the server;

the authentication center feeds back initialization information of the server sent back by the server to the client; and the auxiliary display unit verifies the validity of the server initialization information, and updates the encrypted information of the server in the case of verifying it as valid.

15. The auxiliary display method according to claim 14, wherein, the security initialization of the auxiliary display unit and the server is dominated by the client or by the server.

16. The auxiliary display method according to claim 15, wherein, the preset encryption key is an encryption key of hardware mask preset by the security module or a read only encryption key preset by device provider.

17. The auxiliary display method according to claim 14, wherein, the subsequent steps comprises:

the auxiliary display unit displays the information after decryption, in the case of the encrypted information being valid; and the auxiliary display unit displays abnormally, in the case of the encrypted information being not valid.

18. The auxiliary display method according to claim 14, wherein, the information displayed in the auxiliary display unit is passive and/or interactive information; the passive information is the information not necessarily required by operations of the user at the client; and the interactive information is the information required by operations of the user at the client.

* * * * *